United States Patent
Rafler

(10) Patent No.: US 8,770,516 B2
(45) Date of Patent: Jul. 8, 2014

(54) OVERHEAD LUGGAGE COMPARTMENT

(75) Inventor: Markus Rafler, Ichenhausen (DE)

(73) Assignee: Diehl Aircabin GmbH, Laupheim (DE)

( * ) Notice: Subject to any disclaimer, the term of this patent is extended or adjusted under 35 U.S.C. 154(b) by 100 days.

(21) Appl. No.: 13/449,757

(22) Filed: Apr. 18, 2012

(65) Prior Publication Data

US 2012/0273615 A1 Nov. 1, 2012

(30) Foreign Application Priority Data

Apr. 27, 2011 (DE) .......................... 10 2011 018 673

(51) Int. Cl.
*B64D 11/00* (2006.01)

(52) U.S. Cl.
USPC ....................................... 244/118.5; 296/37.8

(58) Field of Classification Search
USPC ................. 244/118.5; 312/319.1, 319.2, 325; 296/37.8
See application file for complete search history.

(56) References Cited

U.S. PATENT DOCUMENTS

| | | | |
|---|---|---|---|
| 6,045,204 A * | 4/2000 | Frazier et al. ................. | 312/247 |
| 6,857,603 B2 * | 2/2005 | Lau et al. ................... | 244/118.1 |
| 6,886,781 B2 * | 5/2005 | Lau et al. ................... | 244/118.1 |
| 2002/0074913 A1 * | 6/2002 | Lau et al. ...................... | 312/307 |
| 2004/0135030 A1 * | 7/2004 | Lau et al. ................... | 244/118.1 |
| 2004/0140398 A1 * | 7/2004 | Lau et al. ................... | 244/118.1 |

FOREIGN PATENT DOCUMENTS

| | | |
|---|---|---|
| GB | 2 018 351 A | 10/1979 |
| WO | WO 2008/065117 A1 | 6/2008 |
| WO | WO 2010/004039 A2 | 1/2010 |

* cited by examiner

*Primary Examiner* — Philip J Bonzell
(74) *Attorney, Agent, or Firm* — Scully, Scott, Murphy & Presser, P.C.

(57) ABSTRACT

An overhead luggage compartment for a passenger aircraft is provided. The overhead luggage compartment has a receptacle which has a base and two side walls extending from the base. The receptacle can be moved from a closed position into an open position. A device for adjusting a maximum opening width of the receptacle is provided on at least one of the side walls.

8 Claims, 9 Drawing Sheets

OVERHEAD LUGGAGE COMPARTMENT

BACKGROUND

The invention relates to an overhead luggage compartment for a passenger aircraft.

An overhead luggage compartment of this type is disclosed by way of example in WO 2010/004039 A2. In the case of the known overhead luggage compartment, a receptacle is provided to receive the luggage. When adjacent receptacles of the overhead luggage compartments in a passenger aircraft are open, it is possible that the loading edges of said receptacles are not perfectly flush with each other owing to manufacturing tolerances.

SUMMARY

The object of the invention is to eliminate the disadvantages of the prior art. In particular, an overhead luggage compartment is to be provided where a maximum opening width of the receptacle or a height of the loading edge of said receptacle can be brought into alignment with the height of another loading edge of an adjacent overhead luggage compartment.

The invention provides that a device for adjusting a maximum opening width of the receptacle is provided on at least one of the side walls.

The provision of the device on at least one of the side walls renders it possible to pre-assemble the receptacle as one assembly unit. The receptacle can be assembled together with the at least partially pre-assembled device in one assembly step. In addition, attaching the device to one of the side walls has the advantage that said device is easily accessible for adjustment purposes.

In one advantageous embodiment of the invention, the device comprises a pin which is substantially linearly adjustable in the opening direction. The pin extends laterally from the side wall in the direction of a housing which receives the receptacle. A counter-stop which corresponds to the pin is expediently provided on the housing and the pin contacts said counter-stop when the maximum opening width of the receptacle has been achieved. Due to the adjustability of the pin, it is now possible to tolerate greater manufacturing tolerances with regard to the arrangement of the counter-stop. It is also possible to attach the counter-stop of two adjacent receptacles at a different height. Any such height difference can be compensated for due to the adjustability of the pin. This provides freedom during the design process and renders it possible to create a compact construction of overhead luggage compartments. As the pin is linearly adjustable, the counter-stop can be kept relatively small, thus saving weight.

In a further advantageous embodiment, the pin extends in an eccentric arrangement from a first adjusting disc which is provided on its outer periphery with a first outer toothing. A first recess for engaging a tool can be provided on a rear side, remote from the pin, of the adjusting disc. The first recess can be implemented such that it is suitable e.g. for engaging a hexagonal tool.

In addition, a second adjusting disc can be provided which comprises a second recess in an eccentric arrangement, which second recess comprises on its inner periphery a first inner toothing which corresponds to the first outer toothing, wherein a second outer toothing is provided on a second outer periphery of the second adjusting disc. A first through-going hole for receiving the first adjusting disc in a positive locking manner is expediently located within the second recess. In the inserted state, the first outer toothing engages with the first inner toothing. As a result, the first adjusting disc is held in a non-rotational manner with respect to the second adjusting disc.

In a further embodiment of the invention, an attachment element is provided which has a third recess, on whose inner periphery is provided a second inner toothing which corresponds to the second outer toothing. A second through-going hole for receiving the second adjusting disc in a positive locking manner is expediently provided within the third recess. In the inserted state, the second outer toothing engages with the second inner toothing. The second adjusting disc is thereby held in a non-rotational manner in the attachment element.

By arranging the first and the second adjusting discs with respect to the attachment element, it is possible to adjust the arrangement of the pin with respect to the attachment element. The proposed device for adjusting the maximum opening width can be manufactured in a simple manner. It is extremely compact and light in weight. Furthermore, the proposed construction prevents an adjusted position of the pin from changing over the course of time.

In a further advantageous embodiment, the attachment element is implemented in two parts, wherein a first part comprises an attachment plate which is provided with a third through-going hole and which has flange sections extending therefrom, and a second part comprises an adaptor plate having the third recess and the second through-going hole provided therein. The adaptor plate is therefore implemented such that the second adjusting disc can be inserted therein in a positive locking manner. The first part can be attached to the side wall of the receptacle, for example by means of an adhesive connection. The said first part can receive by means of insertion the second part, which second part can receive the second adjusting disc, which second adjusting disc can receive the first adjusting disc. By suitably arranging the first and second adjusting disc, it is possible to adjust the position of the pin rapidly and simply. Markings may be provided for this purpose on the adjusting discs and on the holding flange.

In a further embodiment of the invention, the attachment element comprises a fourth recess, which surrounds the third recess, for receiving a cover in a positive locking manner. Once the adjusting discs have been inserted, they can be prevented from falling out by fitting the cover. For this purpose, the cover can be screwed to the attachment element.

BRIEF DESCRIPTION OF THE DRAWINGS

An exemplary embodiment of the invention is explained in greater detail below with reference to the drawings, in which:

FIG. 9b shows a perspective view of a rear side of the cover in accordance with FIG. 9a.

DETAILED DESCRIPTION OF EXEMPLARY EMBODIMENTS

Figure 1:
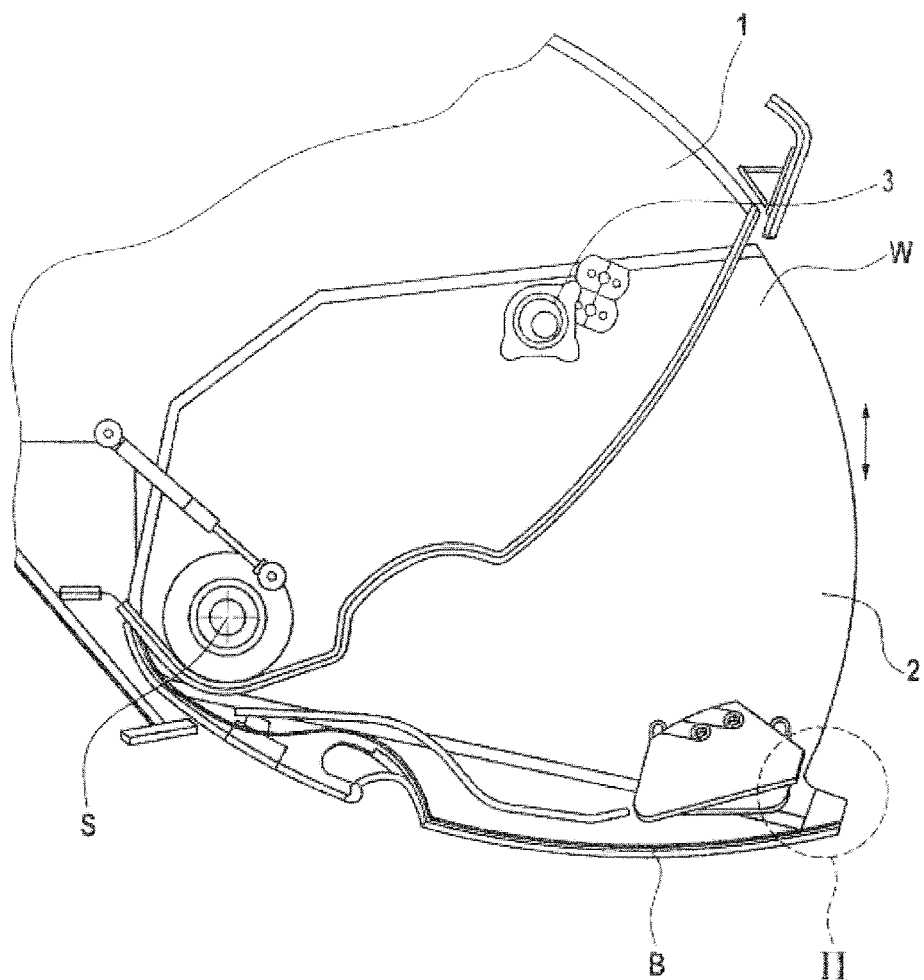
FIG. 1 shows a schematic lateral view of an overhead luggage compartment.
Figure 2:
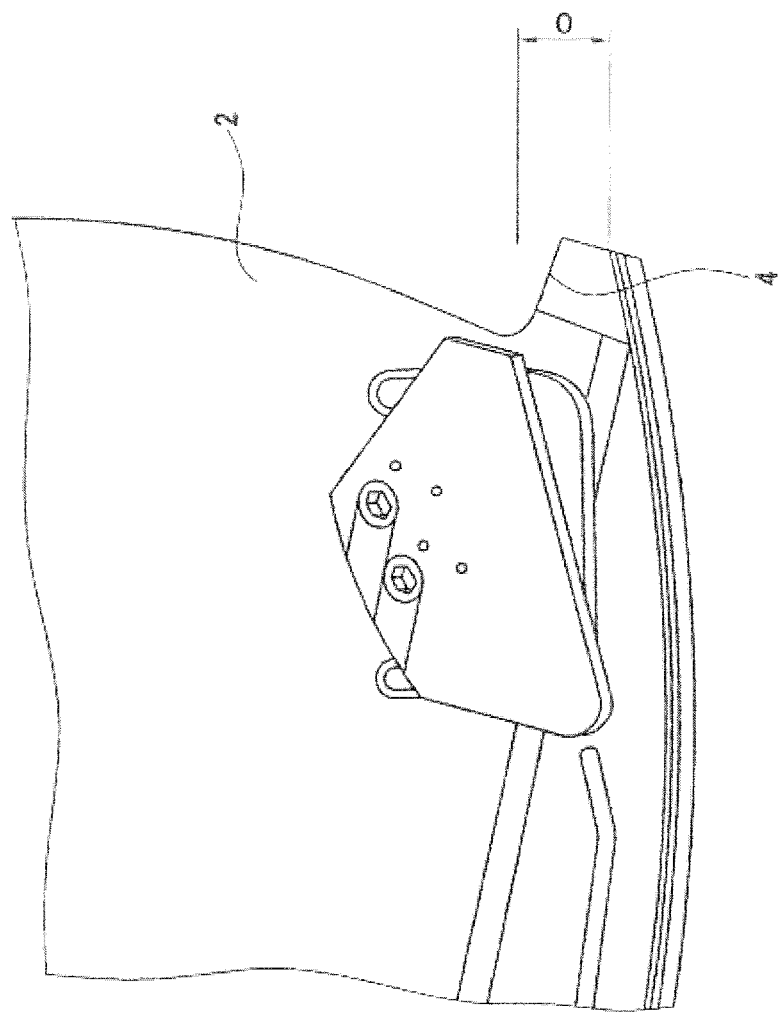
FIG. 2 shows a detailed view in accordance with FIG. 1.

FIGS. 1 and 2 show an overhead luggage compartment for a passenger aircraft. The overhead luggage compartment comprises a housing 1 which is fixedly connected to a cabin (not illustrated here); a receptacle 2 is held on said housing in such a manner as to be able to pivot about a pivot axis S. The receptacle 2 comprises a base B and opposite side walls W.

The receptacle 2 is shown in FIG. 1 in its maximum opening width O. The maximum opening width O is defined by an adjusting device 3 which enables the maximum opening width O of the receptacle 2 to be adjusted.

FIG. 2 shows a detailed view in accordance with FIG. 1. In FIG. 2 a maximum opening width or a position of a loading edge 4 of the receptacle 2 in the z-direction is designated with the reference letter O. The maximum opening width O can be set within the range indicated by the arrows using the adjusting device 3.

FIGS. 3 to 9b show in detail the adjusting device 3 and the essential individual components thereof. A first adjusting disc 5 comprises on its front side a pin 6 and on its first outer periphery a first outer toothing 7. A first recess 8 for engaging a tool is provided on a rear side, remote from the pin 6, of the first adjusting disc 5. The recess can be hexagonal in shape. The reference numeral 9 designates a second adjusting disc, which comprises a second recess 10 having a first inner toothing 11 which corresponds to the first outer toothing 7. A first through-going hole 12 is provided within the eccentrically disposed second recess 10. The first through-gong hole 12 is implemented such that a first cylindrical section Z1 of the first adjusting disc 5 can be inserted therein in a positive locking manner. A second outer toothing 13 is provided on the outer periphery of the second adjusting disc 9.

The reference numeral 14 designates an adaptor ring which comprises a third recess 16; a second inner toothing 15 which corresponds to the second outer toothing 13 is provided on the inner periphery of the said recess. A second through-going hole 17 is provided within the third recess 16 and enables a second cylindrical section Z2 of the second adjusting disc 9 to be inserted in a positive locking manner. The reference numeral 18 designates two first flange sections which extend from the adaptor ring 14. The third recess 16 is surrounded in sections by a fourth recess 26.

Figure 8A:
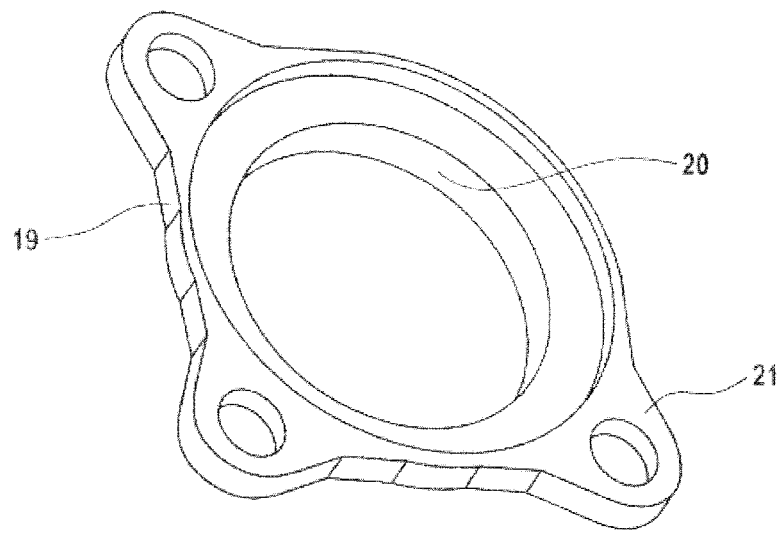
FIG. 8b shows a perspective view of a rear side of the attachment plate in accordance with FIG. 8a, FIG. 9a shows a perspective view of a front side of a cover
Figure 8B:
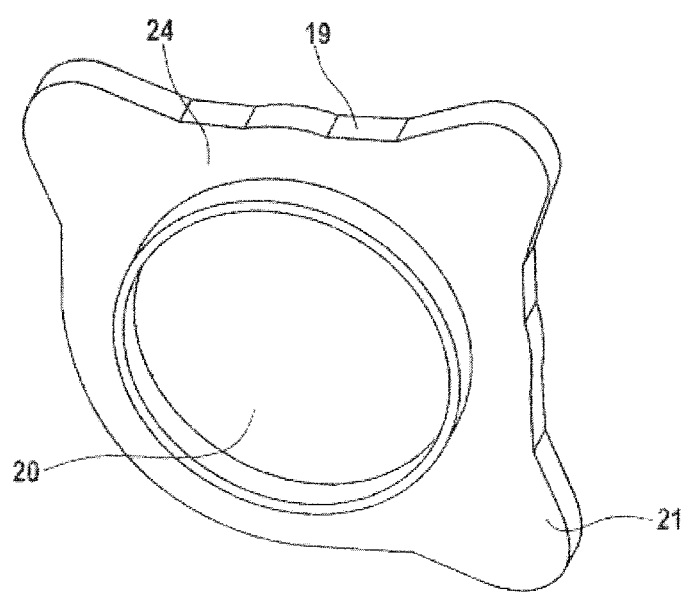

FIGS. 8a and 8b show an attachment plate 19 with a third through-going hole 20 provided therein. The third through-going hole 20 is implemented such that a third cylindrical section Z3 of the adaptor ring 14 can be inserted therein in a positive locking manner. The reference numeral 21 designates second flange sections which extend from the attachment plate 19.

Figure 9A:
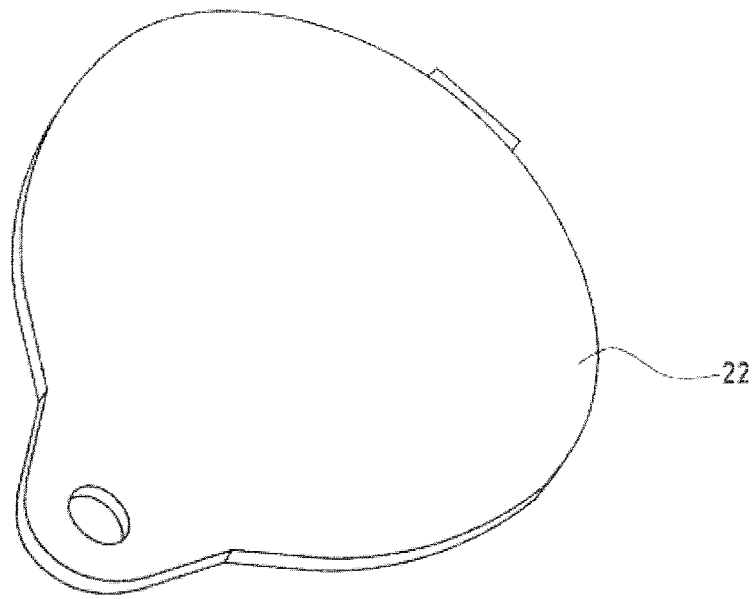
Figure 9B:
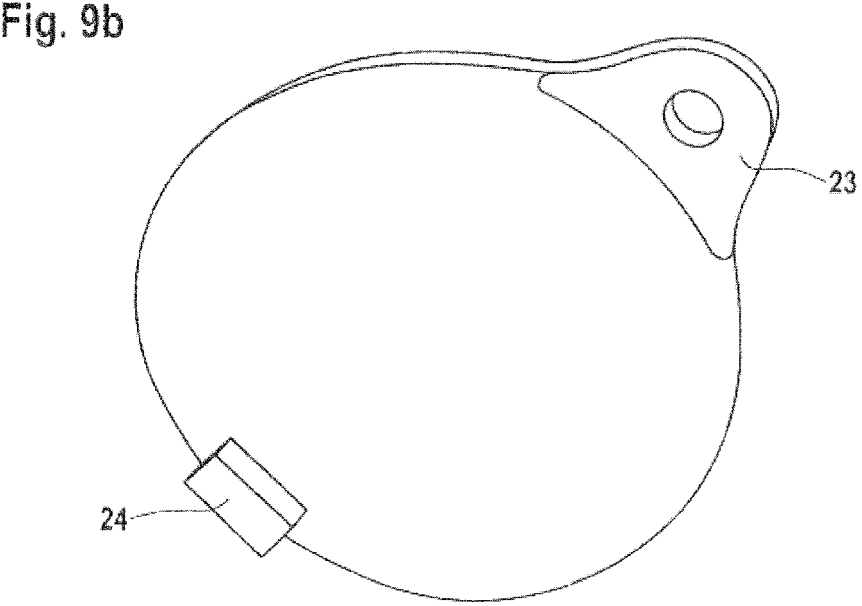

FIGS. 9a and 9b show a cover 22 which comprises a third flange section 23 which corresponds to one of the second flange sections 21. A hook-like protrusion 24 formed on the cover 22 corresponds to a cover recess 25 provided in the adaptor ring 14.

The device 3 is assembled and functions as follows:

The attachment plate 19 is attached to a side wall W of the receptacle 2, for example by means of an adhesive. A through-going hole is provided for this purpose in the side wall (not illustrated here) of the receptacle and the inner diameter of said through-going hole corresponds to the outer diameter of a fourth cylindrical section Z4 of the attachment plate 19. In the assembled state, the front side, illustrated in FIG. 8a, of the attachment plate 19 faces the interior space of the receptacle 2. The adaptor ring 14 is inserted into the attachment plate 19 such that the first flange sections 18 cover the two opposite-lying second flange sections 21. The first flange sections 18 are attached to the second flange sections 21, for example by means of screws. Subsequently, the second adjusting disc 9 is inserted in the appropriate orientation into the adaptor ring 14, so that the second outer toothing 13 engages with the second inner toothing 15. The first adjusting disc 5 is then inserted into the second adjusting disc 9, so that its first outer toothing 7 engages with the first inner toothing 11. Subsequently, the first 5 and the second adjusting disc 9 are secured by fitting the cover 22 in the fourth recess 26. The third flange section 23 is fixedly connected to the remaining second flange section 21, for example by means of a screw.

Figure 3:
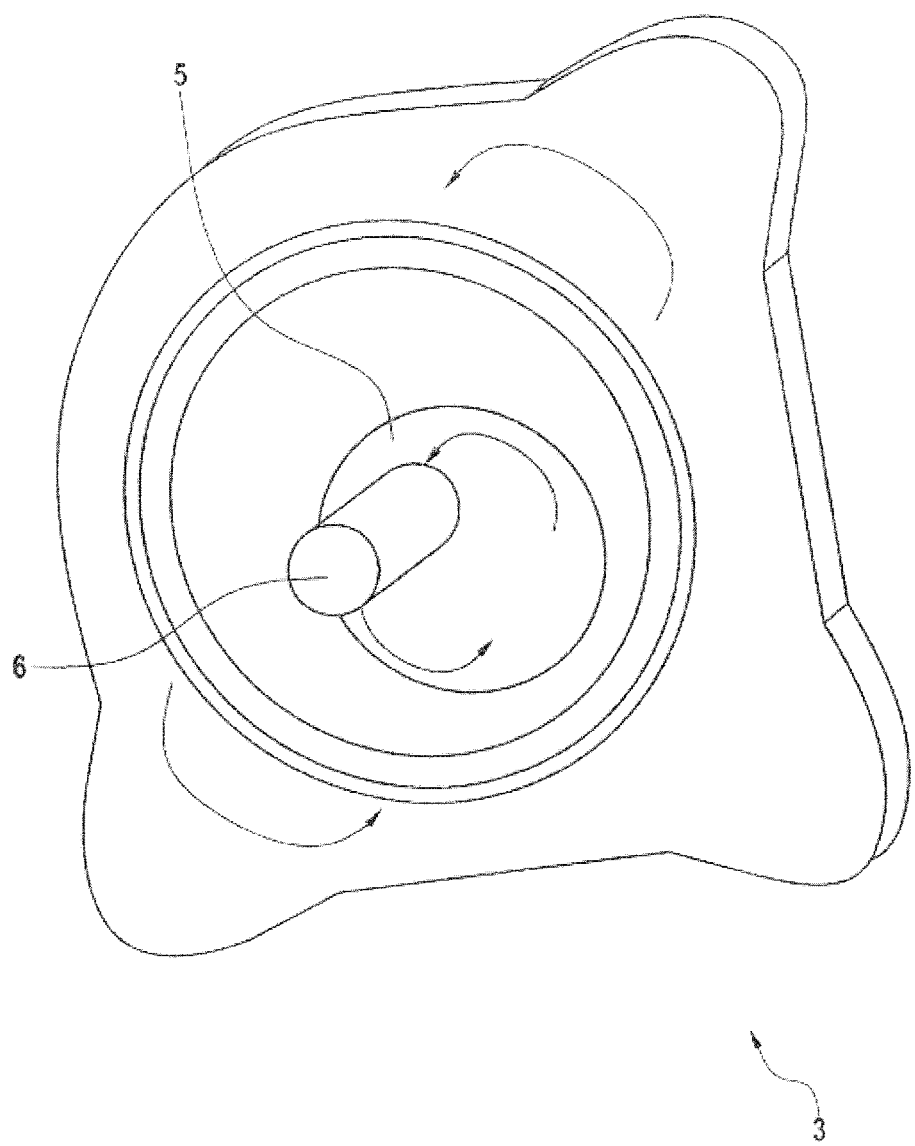
FIG. 3 shows a perspective view of a front side of a device for adjusting a maximum opening width of the receptacle.
Figure 4:
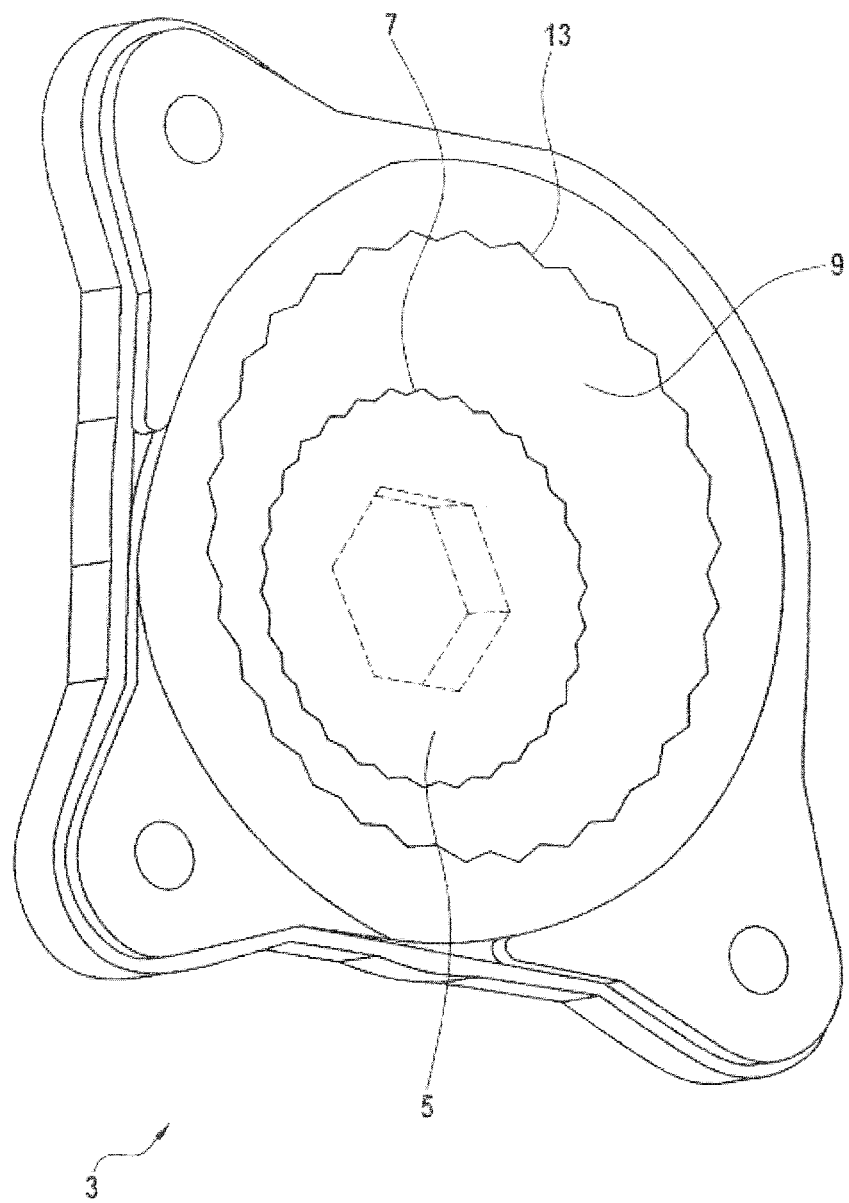
FIG. 4 shows a perspective view of the rear side of the device in accordance with FIG. 3.
Figure 5A:
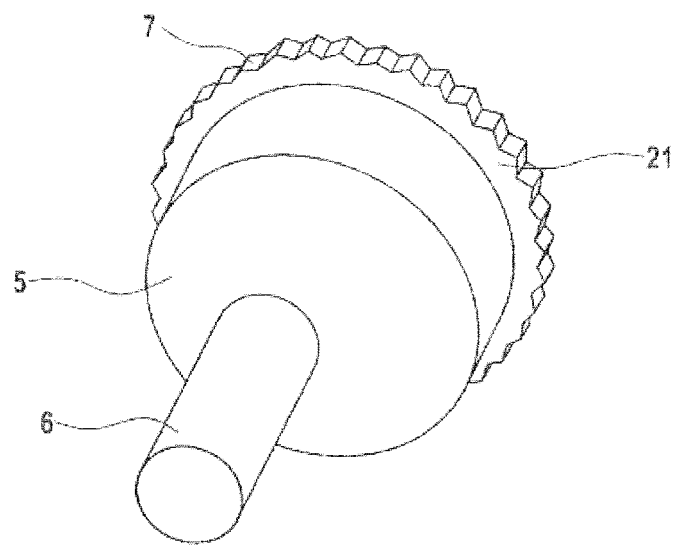
FIG. 5a shows a perspective view of a front side of a first adjusting disc.
Figure 5B:
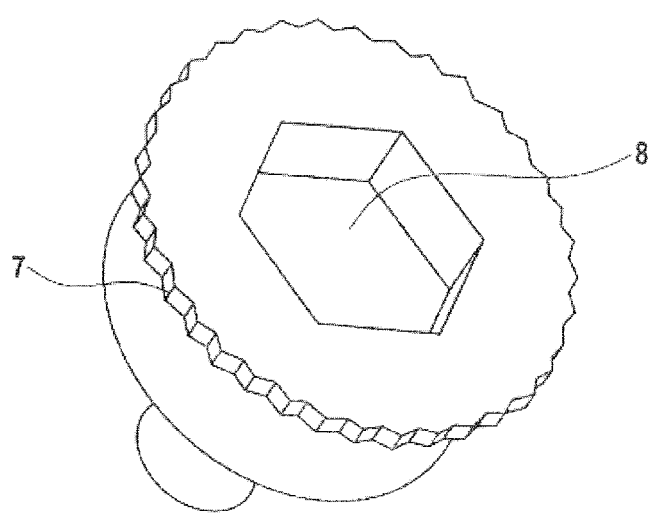
FIG. 5b shows a perspective view of a rear side of the first adjusting disc in accordance with FIG. 5a, FIG. 6a shows a perspective view of a front side of a second adjusting disc.
Figure 6A:
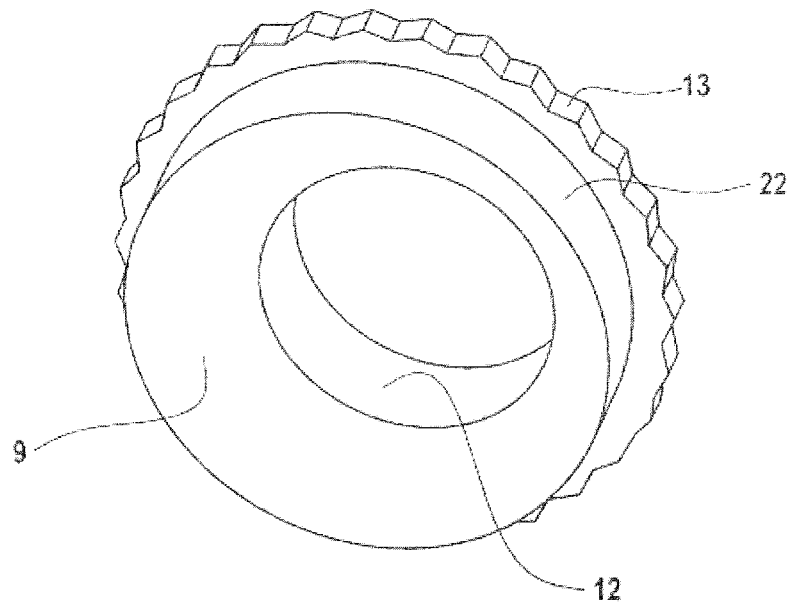
FIG. 6b shows a perspective view of a rear side of the second adjusting disc in accordance with FIG. 6a, FIG. 7a shows a perspective view of a front side of an adaptor ring.
Figure 6B:
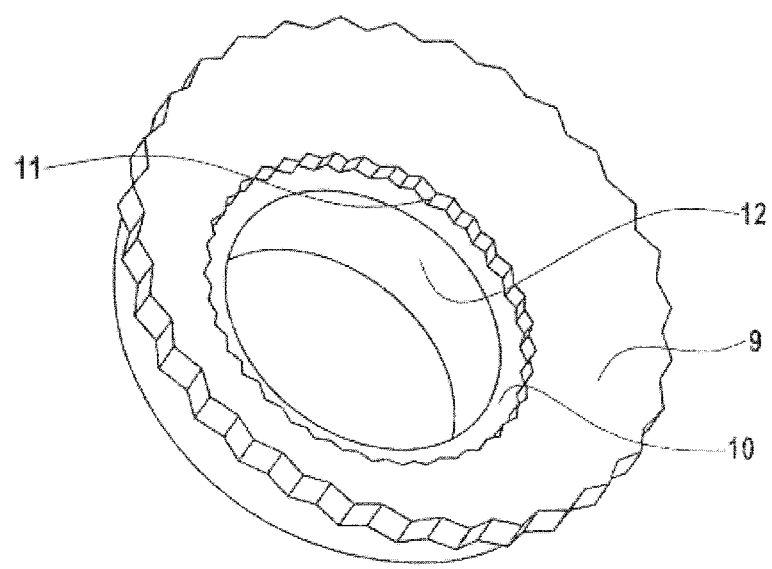
Figure 7A:
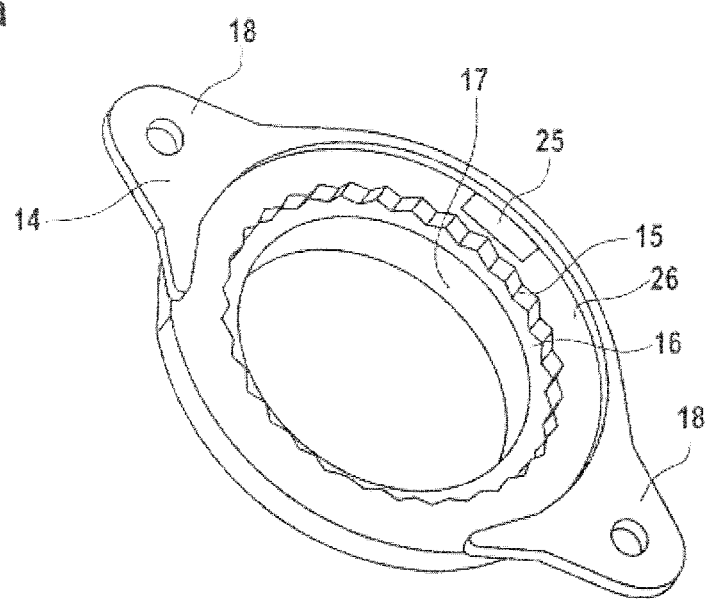
FIG. 7b shows a perspective view of a rear side of the adaptor ring in accordance with FIG. 7a, FIG. 8a shows a perspective view of a front side of an attachment plate.
Figure 7B:
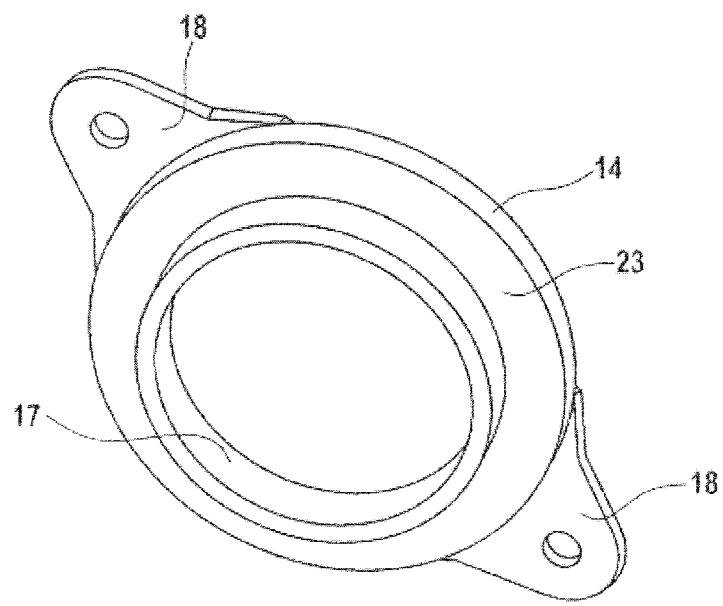

As is particularly evident from FIG. 3, the position of the pin 6 can be adjusted by suitably arranging the first 5 and the second adjusting disc 9. The pin 6 cooperates with a counter-stop (not illustrated in detail here), which is fixedly attached to the housing 1 in a suitable position. A maximum opening width O or a position of the loading edge 4 in the z-direction can be changed by changing the position of the first 5 and the second adjusting disc 9.

LIST OF DESIGNATIONS

1 Housing
2 Receptacle
3 Adjusting device
4 Loading edge
5 First adjusting disc
6 Pin
7 First outer toothing
8 First recess
9 Second adjusting disc
10 Second recess
11 First inner toothing
12 First through-going hole
13 Second outer toothing
14 Adaptor ring
15 Second inner toothing
16 Third recess
17 Second through-going hole
18 First flange section
19 Attachment plate
20 Third through-going hole
21 Second flange section
22 Cover
23 Third flange section
24 Hook-like protrusion
25 Cover recess
26 Fourth recess
B Base
O Maximum opening width
S Pivot axis
W Side wall
Z1 First cylindrical section
Z2 Second cylindrical section
Z3 Third cylindrical section Z4 Fourth cylindrical section

The invention claimed is:

1. An overhead luggage compartment for a passenger aircraft, comprising:
   a receptacle which comprises a base and two side walls extending from the base, which receptacle can be moved from a closed position into an open position, and
   a device for adjusting a maximum opening width of the receptacle, the device being provided on at least one of the side walls,
   wherein the device comprises a pin which is substantially linearly adjustable in the opening direction, and
   wherein the pin extends, in an eccentric arrangement, from a first adjusting disc, and wherein said first adjusting disc comprises a first outer periphery and a first outer toothing provided on the first outer periphery.

2. The overhead luggage compartment according to claim 1, wherein the first adjusting disc further comprises: a rear side remote from the pin; and a first recess provided on the rear side for engaging a tool.

3. The overhead luggage compartment according to claim 2, further comprising a second adjusting disc, wherein the second adjusting disc comprises:
   a second recess in an eccentric arrangement;
   a first inner toothing corresponding to the first outer toothing; and
   a second outer toothing provided on an outer periphery of the second adjusting disc.

4. The overhead luggage compartment according to claim 3, further comprising a first through-going hole for receiving the first adjusting disc in a positive locking manner, wherein the first through-going hole is provided within the second recess.

5. The overhead luggage compartment according to claim 3, further comprising an attachment element which has a third recess, wherein a second inner toothing is provided on an inner periphery of the attachment, and wherein the second inner toothing corresponds to the second outer toothing.

6. The overhead luggage compartment according to claim 5, wherein the attachment element comprises a fourth recess, which surrounds the third recess, for receiving a cover in a positive locking manner.

7. The overhead luggage compartment according to claim 5, further comprising a second through-going hole for receiving the second adjusting disc in a positive locking manner, wherein the second through-going hole is provided within the third recess.

8. The overhead luggage compartment according to claim 7,
   wherein the attachment element comprises a first part and a second part,
   wherein the first part comprises an attachment plate, the attachment plate comprising a third through-going hole and a plurality of flange sections extending from the third through-going hole, and
   wherein the second part comprises an adaptor ring, wherein the third recess and the second through-going hole are provided in the adaptor.

* * * * *